(12) United States Patent
Kramm et al.

(10) Patent No.: US 9,029,001 B2
(45) Date of Patent: May 12, 2015

(54) SEPARATOR FOR GEL ELECTROLYTE STORAGE BATTERIES

(75) Inventors: Friedrich Kramm, Buedingen (DE); Georg Meckl, Welden (DE); Harald Niepraschk, Buedingen (DE); Peter Nemec-Losert, Altenstadt (DE)

(73) Assignee: Exide Technologies GmbH (DE)

( * ) Notice: Subject to any disclaimer, the term of this patent is extended or adjusted under 35 U.S.C. 154(b) by 1281 days.

(21) Appl. No.: 12/733,870

(22) PCT Filed: Oct. 17, 2008

(86) PCT No.: PCT/EP2008/064069
§ 371 (c)(1),
(2), (4) Date: Sep. 30, 2011

(87) PCT Pub. No.: WO2009/050286
PCT Pub. Date: Apr. 23, 2009

(65) Prior Publication Data
US 2012/0021272 A1     Jan. 26, 2012

(30) Foreign Application Priority Data
Oct. 20, 2007   (DE) .......................... 10 2007 050 242

(51) Int. Cl.
| H01M 2/14 | (2006.01) |
| H01M 2/18 | (2006.01) |
| H01M 2/16 | (2006.01) |
| H01M 10/10 | (2006.01) |

(52) U.S. Cl.
CPC ................ *H01M 2/14* (2013.01); *H01M 2/162* (2013.01); *H01M 2/1653* (2013.01); *H01M 2/18* (2013.01); *H01M 10/10* (2013.01); *Y02E 60/126* (2013.01)

(58) Field of Classification Search
USPC .................................. 429/129, 131, 143, 136
See application file for complete search history.

(56) References Cited

U.S. PATENT DOCUMENTS

| 4,317,872 A | 3/1982 | Varma |
| 4,539,271 A * | 9/1985 | Crabtree ........................ 429/94 |
| 5,128,220 A * | 7/1992 | O'Hara et al. ................ 429/137 |
| 6,284,412 B1 * | 9/2001 | Minakata et al. ............. 429/303 |

FOREIGN PATENT DOCUMENTS

| DE | 1194015 A | 9/1958 |
| DE | 3711674 A1 | 10/1988 |
| DE | 4116079 A1 | 11/1991 |
| DE | 69209230 T2 | 11/1996 |
| EP | 0753895 A1 | 1/1997 |
| EP | 1720210 A1 | 11/2006 |
| FR | 1528057 A | 6/1968 |

* cited by examiner

*Primary Examiner* — Patrick Ryan
*Assistant Examiner* — Julian Anthony
(74) *Attorney, Agent, or Firm* — Cantor Colburn LLP

(57) ABSTRACT

A separator (1) for electrode plates (2) in gel storage batteries having two substantially rectangular layers (3, 3') of a flat separator material, which layers come to lie in mutually superposed relationship. In order to provide less expensive separators for the separation of plate electrodes in gel storage batteries, which have a low electrical resistance and which afford additional protection for the edges and side surfaces and at the same time permit homogenous gel filling of the storage battery, the invention proposes that the two layers of separator material are connected together at least portionwise in the region of their edges, forming a casing or pocket for the introduction of an electrode plate and a method and battery employing the separator.

18 Claims, 3 Drawing Sheets

(12) United States Patent

SEPARATOR FOR GEL ELECTROLYTE STORAGE BATTERIES

CROSS REFERENCE TO RELATED APPLICATIONS

This claims priority from German Patent Application DE 102007050242.9 filed Oct. 20, 2007.

BACKGROUND OF THE INVENTION

The invention concerns novel separators for storage batteries and the use of separators in gel storage batteries.

Storage batteries with alternately positive and negative electrode plates use separators for the separation of the electrode plates, the separators preventing direct contact between the plates and thus a short-circuit.

Essentially a distinction is to be drawn between two kinds of storage batteries: gel storage batteries (sealed storage batteries) which contain the electrolyte, usually sulphuric acid, in a condition of being bound into a gel, usually a thixotropic silica gel, and liquid storage batteries (closed storage batteries) in which the electrolyte is present in the form of a liquid.

In closed storage batteries, besides simple separators in layer form, separation of the electrode plates is also effected by using pocket separators in which the electrode plates are disposed in a pocket or casing of separator material. Particularly in relation to the positively charged electrode plates that has the advantage that the electrode slurry which is produced there is caught and does not come into contact with the adjacent negative electrode plates. In addition pocket separators also afford better protection from short-circuits as they surround the electrode plates at the edges and peripheral surfaces. Slipping of the separator therefore does not result in regions of the electrode plates being exposed, with the danger of a short-circuit.

Gel electrolyte storage batteries (sealed storage batteries), for example with positive grid plates, generally use leaf separators comprising phenolic resins, PVC, PE, latex or coarse glass fibres. For optimum filling of the storage battery with gel those leaf separators can have special have special surface structures and, on the side facing towards the positive electrode plate, frequently have a glass fibre mat which is laminated thereonto and which provides a reinforcing effect, by which the positive material which slurries out is mechanically stabilised and thus longevity in the case of frequent charging and discharging cycles is improved.

The disadvantage of those leaf separators is that they are highly expensive by virtue of the materials used and large amounts of material have to be used to achieve adequate stiffness. The leaf separators are difficult to handle and as a result incur a high level of complication and expenditure upon packaging and upon removal from the packaging and high levels of consumption of packaging material. In addition, with that kind of separators, there is a need for additionally protecting the electrode plates at the peripheral surfaces and edges and they have a comparatively high resistance.

Pocket separators have hitherto been used only in relation to liquid storage batteries (closed storage batteries). Use of the pocket separators, known for that purpose, for gel storage batteries (sealed storage batteries) was hitherto not possible as, when using those known pocket separators, homogenous distribution of the gel electrolyte is prevented by the pockets and as a result the service life and quality of the storage battery would have been considerably impaired.

Therefore the invention is based on the problem of providing less expensive separators for the separation of plate electrodes in gel storage batteries, which have a low electrical resistance and which afford additional protection for the edges and side surfaces and at the same time permit homogenous gel filling of the storage battery.

BRIEF SUMMARY OF THE INVENTION

According to the invention that problem is solved by the use of a separator for electrode plates in gel storage batteries having two substantially rectangular layers of a flat separator material, which layers come to lie in mutually superposed relationship, wherein the two layers of separator material are connected together at least portion-wise in the region of their edges, forming a casing or pocket for the introduction of an electrode plate.

In accordance with the invention, a separator (1) for electrode plates (2) of storage batteries is provided. The separator has two substantially rectangular layers (3, 3') of a flat separator material, which layers come to lie in mutually superposed relationship, wherein the two layers of separator material are connected together at least portion-wise in the region of their edges, forming a casing or pocket for the introduction of an electrode plate and the separator material has a separator leaf (6) with ribs (5, 5') on its mutually opposite surfaces, the configuration of the ribs (5) on a surface of the separator leaf has a multiplicity of intersection points (5") with the configuration of the ribs (5') on the opposite surface of the separator leaf. The invention also includes a method for separating electrode plates using the separator and a battery employing the separator.

DETAILED DESCRIPTION OF THE INVENTION

Figure 1:
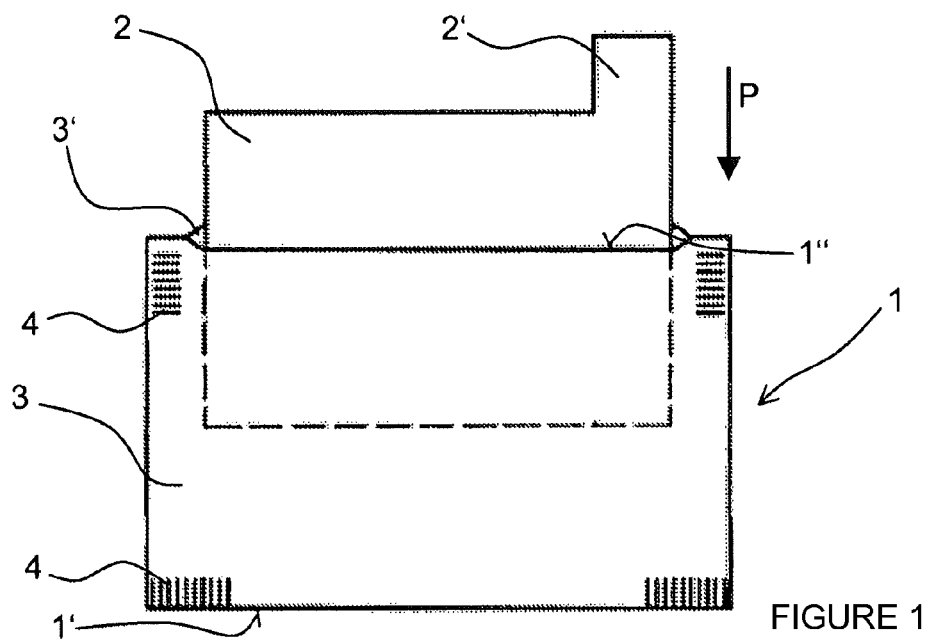
FIG. 1 shows an embodiment of a separator according to the invention for use in a gel storage battery.

It will be appreciated that the separator is of such a size that in respect of width and height it is of a greater extent than the electrode plates, for which the separator is to be used.

It is advantageous if the two layers of the separator are not connected together portion-wise in the region of the upper edges to provide an opening for the gel filling operation and for degassing of the plate set and an insertion opening for an electrode plate. The insertion opening however can also be provided at one of the two sides of the separator. An insertion opening at the lower edge of the separator is possible but less desirable as then the electrode plate would slip out of the separator in operation, if it is not fixed in some other fashion or the insertion opening is not subsequently closed.

By virtue of the fact that the two layers of separator material are only connected together portion-wise, forming a casing or pocket, it is possible that, when filling the storage battery, the gel electrolyte is introduced both into and also beside the casing, and can also run out of the casing again, thus resulting in homogenous gel filling which accordingly uniformly conducts charge.

For filling gel storage batteries, use is usually made of thixotropic gels which can be liquefied by shearing forces, usually by vigorous stirring, and are introduced into the storage battery in that low-viscosity form. As the liquefaction is reversible the electrolyte solidifies again to give a high-viscosity gel when the storage battery is left to stand after the filling operation. As liquefaction of the gel electrolyte is not wanted in storage batteries in operation under a slight loading such as slight shaking or vibration, the thixotropic gel is so selected that it is liquefied only in relation to a high shearing loading and rapidly restores its high viscosity. Filling of the gel storage battery must therefore be effected very quickly to avoid premature solidification of the gel and to achieve homogenous filling. That is only possible if the liquefied gel can flow as unimpededly as possible into all regions of the storage battery to be filled and does not have to flow into very narrow and delimited regions.

Preferably therefore the flat separator material comprises a separator leaf having ribs on both sides, that is to say on its mutually opposite surfaces, wherein the configuration of the ribs on a surface of the separator leaf has a multiplicity of intersection points with the configuration of the ribs on the opposite surface of the separator leaf.

The ribs which are arranged on mutually opposite sides or surfaces of the separator leaf and which cross in their configuration do not touch each other directly as arranged between them at the intersection points is the separator leaf representing the base leaf of the separator material.

However the separator material including the ribs is of the largest general material thickness at the intersection points as at those intersection points, added to the thickness of the flat separator leaf there is additionally the respective height of the two mutually intersecting ribs arranged on the opposite surfaces of the separator leaf. In that way the multiplicity of intersection points represents spacers which prevent excessively snug contact of the flat separator leaf against the electrode plate and also the separators in relation to each other. The spacer function could also be performed by ribs which extend in substantially coincident relationship on both sides or surfaces of the separator leaf. The advantage of many intersection points which are distributed as much as possible however is that they impart overall a higher degree of stability to the intersecting ribs and the material, than if the ribs were to extend in coincident relationship on the opposite surfaces of the separator leaf. The function of the spacers could also be performed by thickened portions of the separator material, disposed in point form on both sides of the separator leaf, but they would not contribute to stabilisation of the material. The ribs which intersect in their configuration on opposite surfaces of the separator leaf thus perform two advantageous functions at the same time.

Having regard to the aforementioned functions of the ribs and the intersection points and considering at the same time that the separators should be used in as space-saving fashion as possible in the respective gel storage batteries, an advantageous embodiment provides that the height of the ribs projecting from the surface of the separator leaf is between 0.3 mm and 2 mm, preferably between 0.5 mm and 1.5 mm. Ribs of greater heights would not only have the result that fewer electrode plates can be used in a storage battery, they would also considerably increase the consumption of electrolyte. Both the resistance and also the costs of the separator could be increased by virtue of the ribs being of a greater height.

As stated hereinbefore the ribs serve on the one hand as spacers between the plates and the separator leaf and on the other hand they also serve to stabilise the separator leaf. In that case the ribs can be of an upwardly narrowing cross-section corresponding for example to a triangle or a trapezium. It is also advantageous if the centre-to-centre spacing or spacing of equivalent points of adjacent ribs on the same side of the separator leaf is between 1 mm and 12 mm, preferably between 2 mm and 10 mm in each case.

The comparatively large spacing of the ribs relative to each other permits a free flow for the gel electrolyte when filling the gel storage battery. In particular in that respect it is also possible to envisage separator materials in respect of which the ribs on one side of the separator leaf involve a relatively small spacing within the preferred range while on the other side they are at a relatively great spacing relative to each other. In these embodiments the sides with the larger spacings can respectively be so arranged that they bear against the electrode plates so that homogenous filling with gel electrolyte is made possible in particular in that region.

Preferably the ribs at least on one side of the separator leaf extend substantially parallel to each other. Such materials are shaped from films by means of a calender or directly by extrusion. In particular separator materials with parallel ribs can be very easily and therefore very inexpensively produced with that method in the form of piece material. Materials in which the ribs on both sides of the separator leaf respectively extend in a straight line and parallel but at an angle to each other so that there are intersection points between the respective configuration of the ribs on the opposite sides are also advantageous for the gel filling operation. Desirably, in the production of the material, a rib-free edge is produced, which is advantageous for connecting the layers together.

In a further preferred embodiment the two layers are in one piece, that is to say made from one web of material, and can be arranged in mutually superposed relationship by folding or bending over. That kind of separator can be easily manufactured by machine from piece material and can be produced with known machines suitable for pocket separators for liquid electrolyte storage batteries.

In a preferred embodiment of the invention the two rectangular layers which come to lie in mutually superposed relationship are completely connected together at an outside edge of the separator over the entire length of the side edge and are at least portion-wise connected together at the mutually opposite outside edge of the separator. That results in a tubular casing into which an electrode can be inserted.

This embodiment can be produced by different methods which can be adapted to the structural conditions of an already existing apparatus for producing pocket separators for liquid storage batteries. In that respect separator material can be folded so that firstly this gives a closed lower edge for the separator and the edges laterally adjoining that lower edge are connected together, in which case then the lower edge is cut off. It is also conceivable for the lower edge to be completely or partially opened prior to joining of the lateral edges by for example stamping out or by two mutually separate layers of separator material being welded only at two opposite outside edges. It is also possible to envisage a production variant in which the separator material is folded over and the oppositely disposed edges are joined together.

In an alternative preferred embodiment of the invention the two rectangular layers which come to lie in mutually superposed relationship are completely connected together at an outside edge of the separator over the entire length of the side edge and, at the adjoining outside edge of the separator, they are connected together at least portion-wise or are not connected together at all.

Particularly preferably the layers are at least partially connected together by welding or knurling. With those kinds of connection for the layers, no additional material such as adhesive or clips is applied so that, besides a saving in material, this also avoids possible unwanted effects in respect of a further material upon electrolysis.

Preferably the separator material is a porous material which preferably comprises PE or PVC. Such materials are acid-resistant and thus withstand the gel electrolyte and are transmissive for ions but not for particles.

An advantage of the separators according to the invention over leaf separators is that they require a lower level of mechanical stability as the reduced inherent stability of the material is compensated by the connection of the layers. Therefore the thickness of the separator material can be so reduced that it involves a lower resistance in comparison with the leaf separators and storage batteries in which separators according to the invention are used have a higher power output and efficiency. It will be appreciated that the stability of the material may not become so low that, in spite of the ribs, it is no longer capable of forming separators which are operable and sufficiently stable when the layers are connected in portion-wise manner. For that reason the separator leaf is desirably of a thickness of between 0.1 and 0.6 mm, preferably between 0.15 and 0.4 mm. The specified values relate to the thickness of the flat base material, that is to say the separator leaf, in other words the heights of the ribs on the two sides are not taken into consideration.

In a further preferred embodiment of the invention provided between the layers is at least one additional separation layer, preferably at least one glass fibre mat, which upon introduction of an electrode plate into the separator is arranged between the separator material and the electrode plate. Such separation layers, preferably glass fibre mats, can increase the cycle stability and thus the service life of the storage battery. They serve in particular in relation to positively charged plate electrodes for reinforcement and reduced slurry deposition of material particles.

A further problem of the invention was to provide separators for electrode plates of storage batteries, which are sufficiently flexible but at the same time also have sufficient stability and with an overall small thickness and thus low level of material consumption and low resistance afford a sufficient spacing between the separators and the electrode plates on the one hand and between the separators relative to each other.

According to the invention that problem is solved by a separator for electrode plates of storage batteries having two substantially rectangular layers of a flat separator material, which layers come to lie in mutually superposed relationship, wherein the two layers of separator material are connected together at least portion-wise in the region of their edges, forming a casing or pocket for the introduction of an electrode plate and the separator material has a separator leaf with ribs on its mutually opposite surfaces, wherein the configuration of the ribs on a surface of the separator leaf has a multiplicity of intersection points with the configuration of the ribs on the opposite surface of the separator leaf.

In regard to the advantages of corresponding separators attention is directed to the foregoing description.

The invention also embraces storage batteries and in particular gel storage batteries with separators having the features described herein. In a particular embodiment of the storage batteries according to the invention only all positive or all negative plate electrodes are provided with a separator according to the invention, in which case the separator is so dimensioned that is prevents direct contact with the respectively adjacent electrode plate of the other polarity.

Further advantages, features, and possible uses of the present invention will be apparent from the description hereinafter of examples, preferred embodiments and Figures.

The separator shown in FIG. 1 comprises two layers 3 and 3' which are respectively connected together in the regions of their corners. The connections 4 are produced by knurling or welding and extend at the lower edge 1' of the separator from the respective corners transversely in the direction of the centre of the lower edge so that they represent a barrier to the electrode plate 2 dropping out. The electrode plate 2 is pushed in the direction of the arrow P into the separator which is of a pocket or casing form. The connections in the region of the upper edge 1" of the separator extends substantially parallel to the direction of insertion of the plate 2 and also to the filling direction of the storage battery so that they influence the flow of gel little or not at all.

Figure 2:
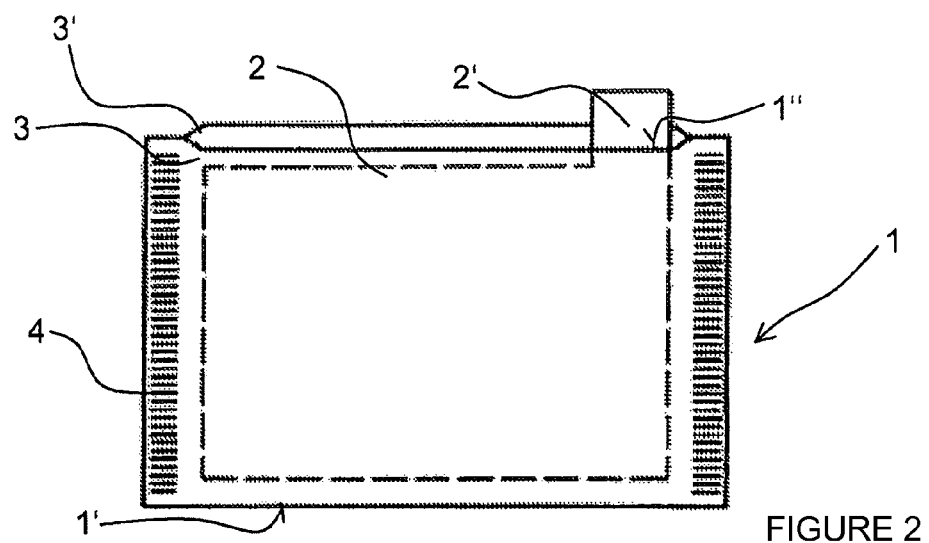
FIG. 2 shows a further embodiment of a separator according to the invention for use in a gel storage battery.
Figure 3:
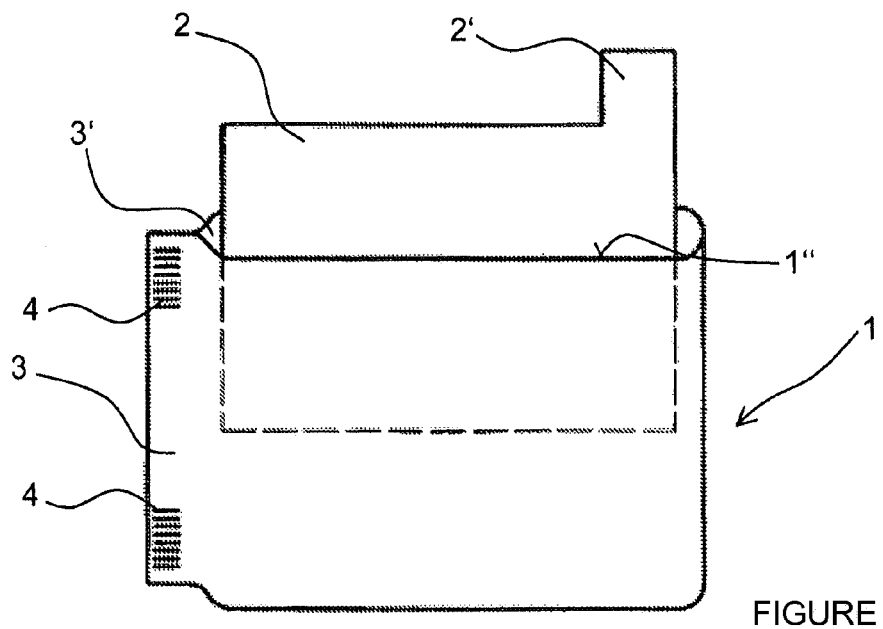
FIG. 3 shows a further embodiment of a separator according to the invention for use in a gel storage battery.
Figure 4:
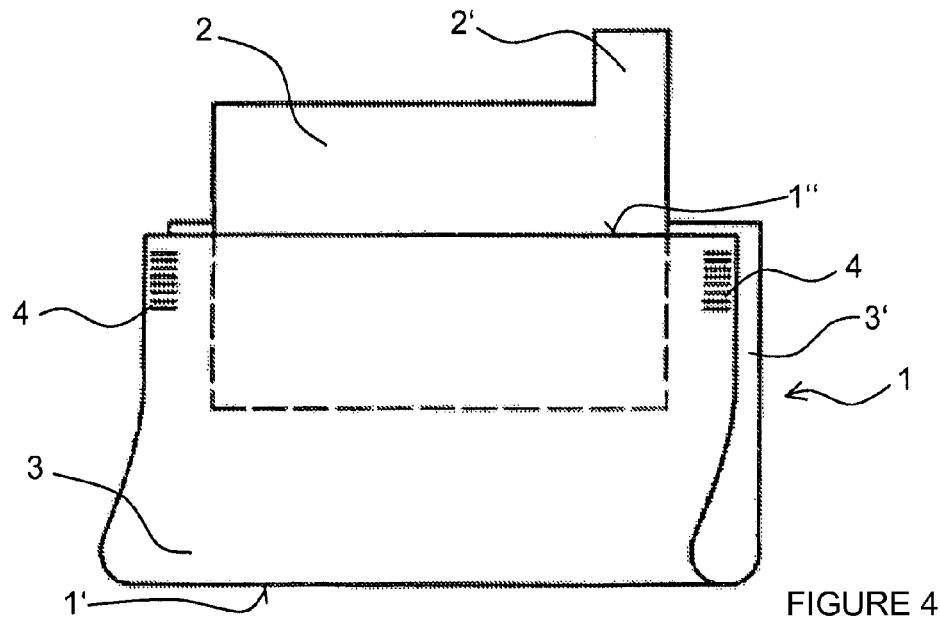
FIG. 4 shows a further embodiment of a separator according to the invention for use in a gel storage battery.

It should be noted that the electrode plate 2 in FIG. 1, as also in FIGS. 3 and 4, is not shown completely pushed into the separator for reasons of enhanced clarity. In this respect the broken lines represent edges of the electrode plate 2 which are not visible when viewing onto the separator with electrode plate. It will be understood however that the electrode plate 2, for operation in a gel storage battery, is pushed so far into the separator, as shown in FIG. 2, that the electrode plate is almost completely covered by the separator material to prevent contact with the next adjacent plate and thus a possible short-circuit. Only the tab 2' projecting upwardly from the electrode plate is and does not need to be completely covered by separator material as the connection of the electrode plate to the pole controlling strap of the storage battery is made by way of the tab 2'. Although the tabs of the electrode plates project out of the separator there is however no danger of a short-circuit as the alternately positive and negative electrode plates are usually so arranged that the tabs 2' of the plates of one polarity are on one side and the tabs of the opposite polarity are on the other side. That is already required by virtue of the arrangement of the connecting straps connecting the electrode plates of the same polarity by way of their tabs.

A separator designed as shown in FIG. 1 is particularly suitable for use in a gel storage battery as, between the connections 4, it has large portions which are not connected together of the side edges or outside edges of the layers of separator material, which permit the through-flow of the liquefied gel and thus homogenous filling of the storage battery. When such a separator is used in a liquid storage battery (closed storage battery) there would be the danger that electrode slurry produced escapes laterally and at the lower edge of the separator, and can be easily distributed in the electrolyte liquid and thereby can lead to a short-circuit by virtue of conductingly connecting the plates. That risk scarcely occurs or does not occur at all in a gel storage battery as the slurry produced, due to the firmness of the gel electrolyte, remains substantially at the location at which it is produced, that is to say at the positive electrode plate.

To completely eliminate the risk of a short-circuit, it may be advantageous, in addition to the separator, to use a bottom covering such as for example a non-woven material or a base bar in the gel storage battery, into which the plate electrodes with separator are fitted and are thereby fixed at a spacing from the adjacent electrodes.

The embodiment shown in FIG. 2 of a separator 1 according to the invention, like the FIG. 1 embodiment, comprises two layers 3 and 3' of the separator material, which in this case however are connected together only at the side edges by means of the connections 4. In this embodiment the lower edge 1' of the separator is completely open, with the plates being prevented from slipping out downwardly during operation of a storage battery by virtue of the tabs 2' being gripped or by placement of the plates on a bar, as described hereinbefore.

In addition the plate 2 is shown in this Figure in a condition of being introduced into the separator pocket which is open at the upper edge 1", as it is also later positioned in operation of a gel storage battery.

This embodiment is desirable when used in a gel storage battery as the downwardly open separator pocket permits rapid uniform filling of the storage battery with gel. Electrode slurry which is produced in operation of the storage battery, because of the high viscosity of the gel, remains at the location at which it is produced and as a result does not lead to short-circuit, as would be the case with liquid storage batteries.

The separator 1 shown in FIG. 3 represents an embodiment in which the lateral edges of the layers are connected together. In this case the two layers 3 and 3' in this embodiment comprise one piece of separator material, which is folded over so that two layers come to lie one upon the other. The folding-over operation already provides a closed side edge at which the layers 3 and 3' are completely connected together. On the side opposite to that edge the layers are connected together by knurlings 4. The respectively upper and lower edges of the layers are not connected together.

This embodiment can be particularly easily produced by machine, in which case the connections 4, as shown in FIG. 2, can also extend as a single connection completely along the corresponding outside edge. When filling the storage battery gel can flow through the upwardly and downwardly open separator and can thereby be rapidly and homogenously distributed. This embodiment is also highly suitable for gel storage batteries and only conditionally suitable for liquid storage batteries as electrode slurry can issue through the lower opening of the separator in a liquid storage battery and can cause short-circuits.

FIG. 4 also shows an embodiment of a separator 1 with electrode plate 2, in which the two layers 3 and 3', as also in FIG. 3, consist of a single piece of material. In this embodiment however the material is folded over in such a way that a closed lower edge 1' of the separator is produced. As in the other illustrated embodiments the separator is open at the upper edge 1" and an electrode plate 2 can be introduced through that opening. For uniform distribution of the liquefied gel electrolyte when filling a storage battery, the connections 4 in this embodiment are produced in the region of the upper edge 1" of the separator 1 so that the liquefied gel can easily flow through the large, laterally remaining openings of the separator. The connections 4 at the side edges of this embodiment can be as shown for use in a gel storage battery. It is however also possible to envisage a plurality of portions extending along the lateral edges, with interruptions disposed therebetween, which serve to provide that gel can flow through when filling the storage battery.

Figure 5:
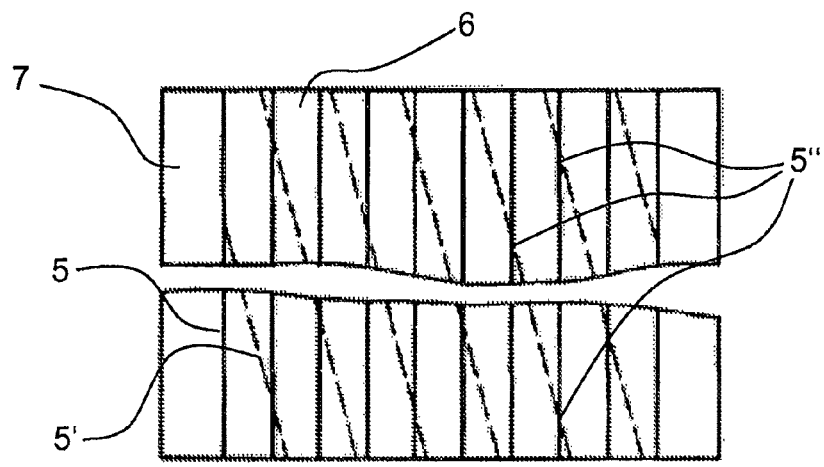
FIG. 5 shows a portion from a separator material of a separator according to the invention.

FIG. 5 shows the arrangement of the ribs 5 and 5' on the flat base material of the separator, the separator leaf 6, wherein the solid lines represent straight-line parallel ribs 5 arranged on the front side and ribs 5' which are arranged on the rear side and which are also parallel and straight are indicated by means of broken lines. The ribs 5 on the front side of the separator material however extend at an angle relative to the ribs 5' arranged on the rear side so that the configurations of the ribs 5 and 5' on the mutually opposite surfaces of the separator leaf 6 have intersection points 5".

In the FIG. 5 embodiment of a separator material the ribs arranged on the front side extend in mutually parallel relationship and parallel to the lateral edges of the material. The ribs on the rear side of the separator material extend in mutually parallel relationship and at an angle relative to the lateral edges of the separator material and to the ribs of the front side.

The ribs 5 and 5' extend only in the region which serves directly for covering over the electrode. The edge surfaces 7 at which the connections 4 between the layers 3 and 3' can be disposed preferably have no ribs. As a result the layers can be easily connected together by knurling or welding, in which respect it is advantageous if two layers which are not provided with ribs bear in mutually superposed relationship at the location of the connection as ribs could adversely affect the stability of the connection. This configuration of the separator material with free edge surfaces without ribs can generally be advantageously applied to all embodiments of the invention.

Figure 6:
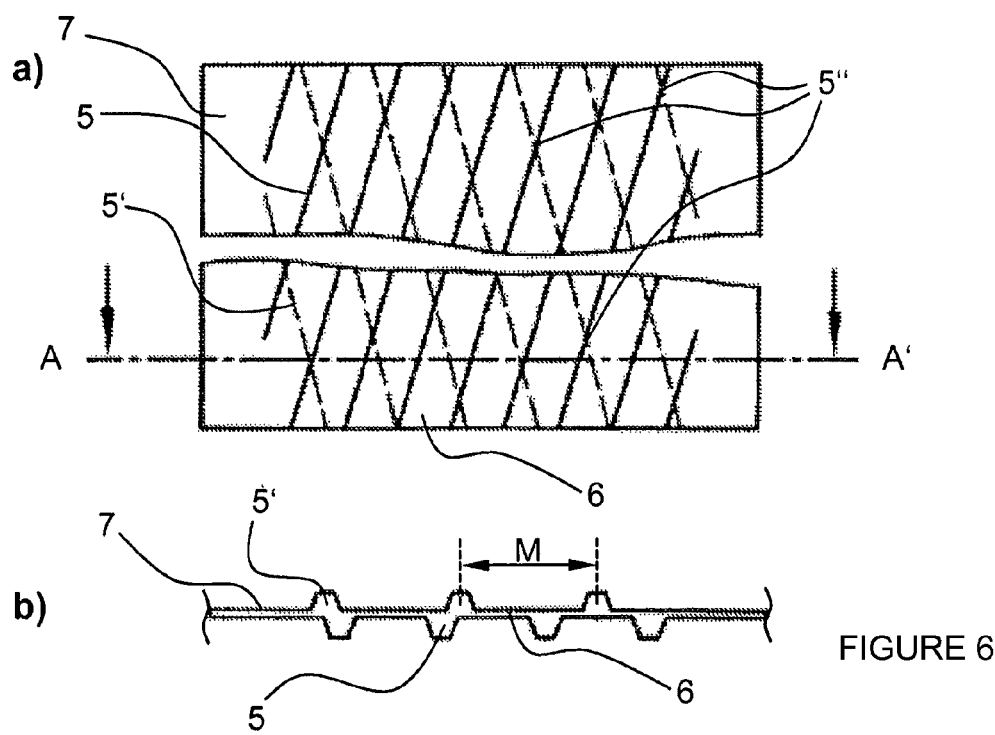
FIG. 6a shows a portion from a further separator material of a separator according to the invention.
FIG. 6b shows a broken-away view in section through the material of FIG. 6a along section line A-A'.

A further arrangement of ribs on a material for a separator is shown in FIG. 6a. In this embodiment also the ribs 5 on the front side and the ribs 5' on the rear side of the material each extend in a straight line and in mutually parallel relationship on the separator leaf 6. The ribs 5 on the front side and the ribs 5' on the rear side of the separator material respectively extend at an angle relative to the lateral edges of the separator material and at an angle to each other. As a result uniformly distributed intersection points 5" of the ribs 5 and 5' are formed on the separator material.

Extending along the lateral edges of the separator material are edge surfaces 7 representing regions of the material which do not have any ribs 5 or 5'.

The interrupted view of the separator material in FIGS. 5 and 6a is intended to show that this involves a material produced in the form of long webs and only respective portions thereof are shown in these Figures. To produce the separators according to the invention portions are cut to size of the dimensions required for manufacture, from those long webs.

FIG. 6b shows a broken-away view in section through the material illustrated in FIG. 6a along section line A-A' in FIG. 6a, the arrows in FIG. 6a showing the direction of view. It can be clearly seen in this respect that the separator leaf 6 is thinner in relation to the regions with ribs. At intersection points at which a rib 5 and a rib 5' respectively intersect (not shown) the material thickness is a multiple in comparison with the separator leaf 6 so that as a result the material is stabilised in point form. Partial overlap of the ribs 5 and 5' in the proximity of intersection points also already leads to an increase in the material thickness.

The double-headed arrow M in FIG. 6b represents the centre-to-centre spacing between two adjacent ribs 5' which are disposed on the same surface of the separator leaf 6. It would also be possible to envisage a separator material whose ribs are of an asymmetric cross-section, in which case the centre-to-centre spacing would correspond to the spacing of equivalent points of adjacent ribs.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features is dispensed with here only for the sake of brevity and readability of the description.

The invention claimed is:

1. A separator (1) for electrode plates (2) of storage batteries having two substantially rectangular layers (3, 3') of a flat separator material, which layers come to lie in mutually superposed relationship, wherein the two layers of separator material are connected together at least portion-wise in the region of their edges, forming a casing or pocket for the introduction of an electrode plate and the separator material has a separator leaf (6) with ribs (5, 5') on its mutually opposite surfaces, the configuration of the ribs (5) on a surface of the separator leaf has a multiplicity of intersection points (5") with the configuration of the ribs (5') on the opposite surface of the separator leaf.

2. A separator according to claim 1 wherein the ribs (5, 5') project from the surface of the separator leaf (6) and are of a height of between 0.3 mm and 2 mm, preferably between 0.5 mm and 1.5 mm.

3. A separator according to claim 2 wherein the ribs (5, 5') at least on a surface of the separator leaf (6) extend in substantially parallel relationship.

4. A separator according to claim 1 wherein a centre-to-centre spacing of adjacent ribs (5, 5') on the same surface of the separator leaf (6) is between 1 mm and 12 mm.

5. A separator according to claim 1 wherein the two layers (3, 3') are produced in one piece and come to lie in mutually superposed relationship by folding.

6. A separator according to claim 1 wherein the two rectangular layers (3, 3') which come to lie in mutually superposed relationship are connected together completely at an outside edge of the separator (1) over the entire length of the side edge and are connected together at least partly at the oppositely disposed outside edge of the separator.

7. A separator according to claim 1 wherein the two rectangular layers (3, 3') which come to lie in mutually superposed relationship are connected together completely at an outside edge of the separator (1) over the entire length of the side edge and are connected together at least portion-wise at the adjoining outside edge of the separator.

8. A separator according to claim 1 wherein the layers (3, 3') are connected together at least partially by welding or knurling.

9. A separator according to claim 1 wherein the separator material is porous polyethylene or porous polyvinylychloride.

10. A separator according to claim 1 wherein the separator leaf (6) is of a thickness of between 0.1 and 0.6 mm.

11. A separator according to claim 1 wherein at least one additional separation layer in the form of a fiber mat is provided between the layers (3, 3'), which upon insertion of an electrode plate (2) into the separator (1) is arranged between the separator material and the electrode plate.

12. A method for retaining an electrode plate (2) in gel storage batteries using a separator having two substantially rectangular layers (3, 3') of a flat separator material, which layers come to lie in mutually superposed relationship, wherein the two layers of separator material are connected together at least partly in the region of their edges, forming a casing or pocket for the introduction of an electrode plate, wherein the separator material has a separator leaf (6) with ribs (5, 5') on both mutually opposite surfaces of the separator leaf (6) and the configuration of the ribs (5) on a surface of the separator leaf has a multiplicity of intersection points (5") with the configuration of the ribs (5') on the opposite surface of the separator leaf.

13. The method of claim 12 wherein the ribs (5, 5') at least on a surface of the separator leaf (6) extend in substantially parallel relationship.

14. The method of claim 12 wherein the two layers (3, 3') are produced in one piece and come to lie in mutually superposed relationship by folding and the two rectangular layers (3, 3') which come to lie in mutually superposed relationship are connected together completely at an outside edge of the separator (1) over the entire length of the outside edge.

15. The method of claim 12 wherein the separator material is porous.

16. The method of claim 12 wherein the separator leaf (6) is of a thickness of between 0.15 and 0.4 mm.

17. The method of claim 12 wherein at least one additional separation layer in the form of a fiber mat is provided between the layers, and which upon insertion of an electrode plate (2) into the separator (1) is arranged between the separator material and the electrode plate.

18. A storage battery having a separator (1) according to claim 1.

* * * * *